United States Patent
Al-Shahrani et al.

(10) Patent No.: US 10,865,340 B2
(45) Date of Patent: Dec. 15, 2020

(54) COATINGS FOR CORROSION PROTECTION

(71) Applicant: Saudi Arabian Oil Company, Dhahran (SA)

(72) Inventors: Abdullah Ayedh Al-Shahrani, Dhahran (SA); Gasan Selman Alabedi, Dhahran (SA); Ihsan Mahmoud Al-Taie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 13 days.

(21) Appl. No.: 16/288,961

(22) Filed: Feb. 28, 2019

(65) Prior Publication Data
US 2020/0277527 A1  Sep. 3, 2020

(51) Int. Cl.
C09K 8/54 (2006.01)
C09D 7/20 (2018.01)
C09D 5/08 (2006.01)
C09D 163/00 (2006.01)

(52) U.S. Cl.
CPC ........... *C09K 8/54* (2013.01); *C09D 5/084* (2013.01); *C09D 5/086* (2013.01); *C09D 7/20* (2018.01); *C09D 163/00* (2013.01); *C09K 2208/32* (2013.01)

(58) Field of Classification Search
None
See application file for complete search history.

(56) References Cited

U.S. PATENT DOCUMENTS

| | | | | |
|---|---|---|---|---|
| 4,199,484 A | * | 4/1980 | Murphey | C08L 63/00 523/424 |
| 6,057,396 A | * | 5/2000 | Lan | C01B 33/44 524/445 |
| 6,271,297 B1 | | 8/2001 | Ishida | |
| 6,555,228 B2 | * | 4/2003 | Guritza | A61L 2/0082 428/414 |
| 7,094,815 B2 | | 8/2006 | Lin | |
| 7,442,728 B2 | | 10/2008 | Lin | |
| 7,959,866 B2 | | 6/2011 | Crawford et al. | |
| 7,989,527 B2 | | 8/2011 | Kaliaguine et al. | |
| 7,989,534 B2 | | 8/2011 | Bhiwankar et al. | |

(Continued)

FOREIGN PATENT DOCUMENTS

| CA | 2739998 | 10/2013 |
|---|---|---|
| CN | 100422276 | 6/2007 |

(Continued)

OTHER PUBLICATIONS

Arslanov and Funke, "The effect of water on the adhesion of organic coating on aluminium," Progress in Organic Coatings, vol. 15, Issue 4, Feb. 29, 1988, 9 pages.

(Continued)

*Primary Examiner* — Jeffrey D Washville
(74) *Attorney, Agent, or Firm* — Fish & Richardson P.C.

(57) ABSTRACT

The present application provides corrosion protection compositions. In one embodiment, the corrosion protection composition of the present disclosure contains a polymer composition saturated with a clay that is intercalated with a $C_{1-22}$ alkyl amine or a $C_{1-22}$ alkyl ammonium cation. Methods of protecting metal surfaces from corrosion are also provided.

19 Claims, 14 Drawing Sheets

(56) References Cited

U.S. PATENT DOCUMENTS

| | | | |
|---|---|---|---|
| 8,598,261 | B2 | 12/2013 | Weng et al. |
| 9,334,387 | B2 | 5/2016 | Al-Qadhi et al. |
| 2008/0281011 | A1 | 11/2008 | Strauss |
| 2011/0269872 | A1 | 11/2011 | Nam et al. |

FOREIGN PATENT DOCUMENTS

| | | |
|---|---|---|
| CN | 101654584 | 2/2010 |
| CN | 103214914 | 7/2013 |
| CN | 103408734 | 11/2013 |
| EP | 1339401 | 9/2003 |
| WO | WO2000069957 | 11/2000 |
| WO | WO2008140843 | 11/2008 |
| WO | WO2010044776 | 4/2010 |
| WO | WO2010064274 | 6/2010 |

OTHER PUBLICATIONS

Barrer, "Diffusion in and through solids," Cambridge, Cambridge University Press, 1951, 486 pages.
Sonora et al., "Electrochemical impedance spectroscopy as a tool for investigating underpaint corrosion," Electrochim. Acta, vol. 41, Issue 7-8, May-Jun. 1996, 10 pages.
Brasher and Kingsbury, "Electrical measurements in the study of immersed paint coatings on metal. I. Comparison between capacitance and gravimetric methods of estimating water-uptake," Journal of Applied Chemistry, Feb. 1954, 11 pages.
Brydson, "Chapter 26: Epoxide Resins," in Plastics Materials, Fourth Edition, London, 1982, 35 pages.
Chen et al., "Epoxy layered-silicate nanocomposites," Progress in Organic Coatings, vol. 47, Issue 3-4, Sep. 2003, 8 pages.
Dellisanti and Valdre, "Study of structural properties of ion treated and mechanically deformed commercial bentonite," Applied Clay Science, vol. 28, Issues 1-4, Jan. 2005, 12 pages.
Frost and Rintoul, "Lattice vibrations of montmorillonite: an FT Raman and X-ray diffraction study," Applied Clay Science, vol. 11, Issue 2-4, Dec. 1996, 13 pages.
Funke, "Problems and progress in organic coatings science and technology," Progress in Organic Coatings, vol. 31, Issue 1, May 1997, 5 pages.
Greenfield and Scantlebury, "The protective action of organic coatings on steel," Journal of Corrosion Science and Engineering, vol. 3, Paper 5, Jan. 2000, 37 pages.
Huttunen-Saarivirta et al., "Characterization and corrosion protection properties of epoxy powder coatings containing nanoclays," Progress in Organic Coatings, vol. 76, Issue 4, Apr. 2013, 11 pages.
Jones, "Chapter 14: Coatings and Inhibitors," in Principles and prevention of corrosion: Second Edition, Prentice Hall, New Jersey, 1996, 38 pages.
Khayankarn et al., "Adhesion and permeability of polyimide-clay nanocomposite films for protective coatings," Journal of Applied Poly. Sci., vol. 89, 2003, 7 pages.
Lepoittevin et al., "Polymer/layered silicate nanocomposites by combined intercalative polymerization and melt intercalation: a masterbatch process," Polymer, vol. 44, Issue 7, Mar. 2003, 8 pages.
Mayne and Mills, "The effect of the substrate on the electrical resistance of polymer film," Oil Col. Chem, Accoc, vol. 58, 1975, 5 pages.
Mayne and Scantlebury, "Ionic conduction in polymer films. II Inhomogeneous structure of varnish films," Brit. Polym. vol. 2, Sep. 1970, 4 pages.
Ranjbar et al., "EIS Investigation of cataphoretically electrodeposited epoxy coatings having different EEWs," Progress in Organic Coatings, vol. 51, Issue 2, Nov. 2004, 4 pages.
Raya et al., "New polylactide/layered silicate nanocomposites. 5. Designing of materials with desired properties," Polymer vol. 44, Issue 21, Oct. 2003, 4 pages.
Sykes, "A variant of the Brasher-Kingsbury equation," Corrosion Science, vol. 46, Mar. 2004, 3 pages.
Tomic et al., "The use of nanoclay in preparation of epoxy anticorrosive coatings," Progress in Organic Coatings, vol. 74, Issue 2, Feb. 2014, 10 pages.
Vaia and Giannelis, "Polymer melt intercalation in organically modified layered silicates: model predictions and experiment," Macromolecules vol. 30, Issue 25, Dec. 15, 1997, 10 pages.
Whyte and Sykes, "Behaviour of a zinc-iron bimetallic couple coated with poly-vinyl butyral lacquer during intermittent exposure to salt solution," Corrosion Science, vol. 49, Aug. 2007, 20 pages.
Wicks et al., "Organic coating," Science and Technology Third Edition, Jan. 2007, 744 pages.
Wong and Buchheit, "Utilizing the structural memory effect of layered double hydroxides for sensing water uptake in organic coatings," Progress in Organic Coatings, vol. 51, Issue 2, Nov. 2004, 12 pages.
Yeh et al., "Enhanced corrosion protection coatings prepared from soluble electronically conductive polypyrole-clay nanocomposite materials," Journal of Applied Polymer Science, vol. 88, Apr. 2003, 9 pages.
Yeh et al., "Enhancement of corrosion protection effect in polyaniline via the formation of polyaniline-clay nanocomposite materials," Chemistry of Materials, vol. 13, Issue 3, Feb. 2001, 6 pages.
Yu et al., "Preparation and properties of polyimide-clay nanocomposite materials for anticorrosion application," Journal of Applied Polym. Sci. vol. 92, Issue 6, Mar. 2004, 10 pages.
PCT International Search Report and Written Opinion in International Appln. No. PCT/US2020/020032, dated May 26, 2020, 14 pages.
Merachtsaki et al., "Corrosion Protection of Steel by Epoxy-Organoclay Nanocomposite Coatings," Coatings, Jun. 2017, 7(84):1-19.

* cited by examiner

COATINGS FOR CORROSION PROTECTION

TECHNICAL FIELD

This disclosure relates to anticorrosive protective coating materials, and more specifically to composites containing epoxy resin and clay, such as bentonite clay.

BACKGROUND

Wellbore operations frequently require using various steel structures. One example of such structures is the pipes that carry hydrocarbons and other production fluids from the reservoir formation to the surface. Presence of water and other corrosive substances corrode the steel pipes and therefore reduce their useful life, reduce well productivity and increase well maintenance costs.

SUMMARY

The present disclosure provides corrosion protection compositions and methods of using these compositions to coat metal surfaces to prevent corrosion. The corrosion protection compositions contain polymers mixed with modified clay, and when applied as coatings, the compositions hinder diffusion of water, oxygen, or electrolytes through the coatings and consequently reduce the risk of corrosion at the coating/metal interface. The presence of clay intercalated with organic cations in the composition enhances corrosion protection performance of the coatings.

In a first general aspect, the present disclosure provides a corrosion protection composition containing a polymer composition that is saturated with a clay intercalated with a $C_{1-22}$ alkyl amine or a $C_{1-22}$ alkyl ammonium cation.

In a second general aspect, the present disclosure provides a method of protecting a metal surface from corrosion, including coating the metal surface with a corrosion protection composition containing a polymer composition impregnated with a clay intercalated with a $C_{1-22}$ alkyl amine or a $C_{1-22}$ alkyl ammonium cation.

The first and the second general aspects may include one or more of the following features. The polymer can be an epoxy resin. The epoxy resin can be a diglycidyl ether of bisphenol A (DGEBA). The clay can be a phyllosilicate, for example, a bentonite. The clay can be intercalated with a hexadecylamine or a hexadecylammonium cation. The polymer composition may be saturated with the clay. An amount of the clay in the polymer composition can be in a range of about 0.5 wt. % to about 5 wt. %, for example, about 3 wt. %. The corrosion protection composition may also contain an amine hardener. The amine hardener can be 4,4'-methylenedianiline. The corrosion protection composition can also contain an organic solvent. The organic solvent can be xylene.

In one implementation, the corrosion protection composition contains an epoxy resin composition saturated with a phyllosilicate clay intercalated with a $C_{1-22}$ alkyl amine or a $C_{1-22}$ alkyl ammonium cation, wherein an amount of the phyllosilicate clay in the saturated epoxy resin composition is in the range of about 0.5 wt. % to about 5 wt. %.

In another implementation, the corrosion protection composition contains a diglycidyl ether of bisphenol A (DGEBA) resin composition saturated with a bentonite clay intercalated with a hexadecylamine or a hexadecylammonium cation, wherein an amount of the bentonite clay in the saturated resin composition is about 3 wt. %.

Metal surface coated with the corrosion protection composition can be a steel surface. Resistance of the coating on the metal surface can be greater than about $1\times10^4$ $\Omega\cdot cm^2$, for example, in a range of about $1\times10^8$ $\Omega\cdot cm^2$ to about $10\times10^8$ $\Omega\cdot cm^2$. Capacitance of the coating on the metal surface can be less than about $1\times10^{-5}$ F, for example, in a range of about $1\times10^{-11}$ F to about $1\times10^{-11}$ F.

In one implementation, the present disclosure provides a method of protecting a metal surface from corrosion, including coating the metal surface with a corrosion protection composition containing an epoxy resin composition impregnated with a phyllosilicate clay intercalated with a $C_{1-22}$ alkyl amine or a $C_{1-22}$ alkyl ammonium cation, wherein resistance of the coating on the metal surface is greater than about $1\times10^4$ $\Omega\cdot cm^2$ and a capacitance of the coating on the metal surface is less than about $1\times10^{-5}$ F.

Unless otherwise defined, all technical and scientific terms used in this disclosure have the same meaning as commonly understood by one of ordinary skill in the art to which the present application belongs. Methods and materials are described in the examples for use in the present application; other, suitable methods and materials known in the art can also be used. The materials, methods, and examples are illustrative only and not intended to be limiting. All publications, patent applications, patents, and other references mentioned in this disclosure are incorporated by reference in their entirety. In case of conflict, the present specification, including definitions, will control.

Other features and advantages of the present application will be apparent from the following detailed description and figures, and from the claims.

DETAILED DESCRIPTION

Figure 1:
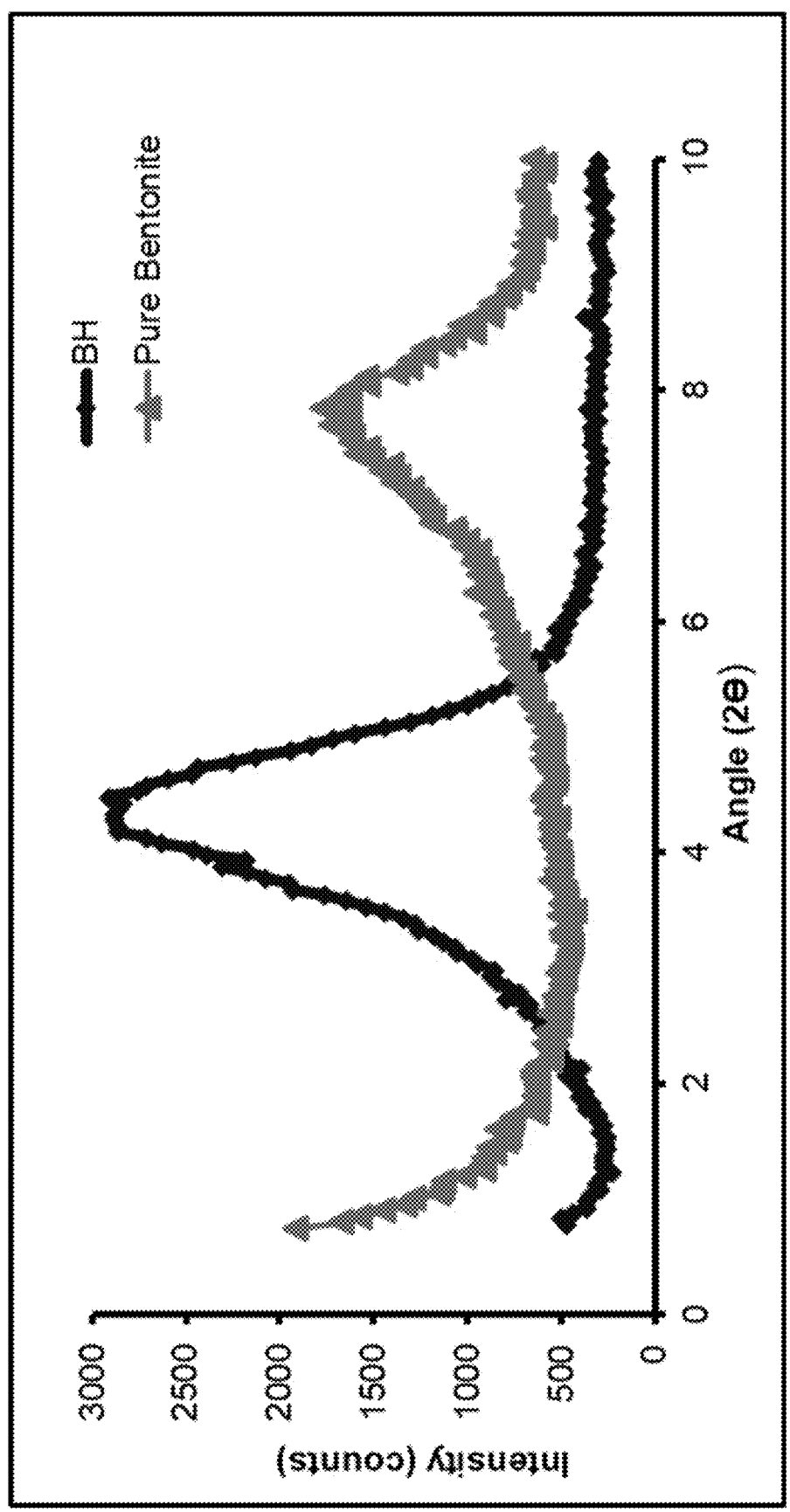
FIG. 1 contains line plots showing the XRD results obtained for untreated bentonite and for bentonite treated with an intercalating agent.

The presence of a coating on a metallic surface provides a physical barrier preventing the metallic surface to be in direct contact with a corrosive environment. Examples of corrosive environments include water and oxygen. These two species are needed to drive the oxygen reduction reaction (also called cathodic reaction) supporting the corrosion process. One problem with simple polymer coatings is that the diffusion rate of water and oxygen through such coatings is too high, leading to a significant amount of water and oxygen at the metal/coating interface. This high diffusion rate is often related to ionic conductivity of the coating. When a coated piece of metal is immersed in an aqueous solution, the coating gains an electrical charge, negative or positive, depending on the physical and chemical nature of the coating. In this case, the coating will attract the oppositely charged species and will allow such species to pass through the coating, along with oxygen and water. The presence of pores, cracks and imperfections in the coating facilitates this process. Poor adhesion of the coating material to the metal surface also facilitates the corrosion process. As water and oxygen accumulate under the coating, the corrosion reactions progress, ultimately leading to chipping and blistering of the coating and coating delamination. One product of the corrosive processes happening on the metal surface is the generation of hydroxyl ions ($^-OH$). Such ions break the adhesive bonds between the coating and the metal surface and facilitate the delamination of the coating.

This disclosure describes coating compositions containing polymer compositions containing particles of clay. As the experimental results described in this application show, the clay in the polymer coating serves as a barrier to reduce ionic conductivity of the coating and, subsequently, to reduce the diffusion rate of water and oxygen through the coating.

As used in this disclosure, the term "clay" refers to rock-forming silicate minerals consisting primarily of silica, silicate anion or disilicate anion, or any combination of these compounds. The clay may be a particulate material containing nanoparticles, microparticles, or macroparticles of clay. The size of clay particles may be in a range of about 1 nm to about 10 mm. In some cases, the particle size is in a range of about 1 µm to about 1 mm. In one implementation, the clay is a phyllosilicate. As used in this disclosure, the term "phyllosilicate" refers to sheet silicate, which forms parallel sheets of silica tetrahedra, $SiO_2$ (1:2 ratio), or disilicate tetrahedra, $Si_2O_5$ (2:5 ratio). The phyllosilicate clays may include variable amounts of iron, magnesium, aluminum, alkali metals, alkaline-earth metals, and their cations. These clays may be anhydrous or may be used in a form of a hydrate, for example, monohydrate, dihydrate, trihydrate, or other polyhydrate. In a hydrated form, phyllosilicate clays have either water ($H_2O$) or hydroxyl groups ($^-OH$) in their structure. Suitable examples of phyllosilicate clays include serpentines, for example, antigorite ($Mg_3Si_2O_5(OH)_4$), chrysotile ($Mg_3Si_2O_5(OH)_4$), or lizardite ($Mg_3Si_2O_5(OH)_4$), clay minerals, for example, halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2,(H_2O)]$), montmorillonite (($Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), talc ($Mg_3Si_4O_{10}(OH)_2$), sepiolite ($Mg_4Si_6O_{15}(OH)_2 \cdot 6H_2O$), palygorskite (or attapulgite) (($Mg,Al)_2Si_4O_{10}(OH) \cdot 4(H_2O)$), or pyrophyllite ($Al_2Si_4O_{10}(OH)_2$), micas, for example, biotite ($K(Mg,Fe)_3(AlSi_3)O_{10}(OH)_2$), fuchsite ($K(Al,Cr)_2(AlSi_3O_{10})(OH)_2$), muscovite ($KAl_2(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), margarite ($CaAl_2(Al_2Si_2)O_{10}(OH)_2$), or glauconite (($K,Na)(Al,Mg,Fe)_2(Si,Al)_4O_{10}(OH)_2$), and chlorite (($Mg,Fe)_3(Si,Al)_4O_{10}(OH)_2 \cdot (Mg,Fe)_3(OH)_6$).

In one implementation, the phyllosilicate clay is a bentonite. Bentonite belongs to a group of clays classified as 2:1 phyllosilicates having the chemical formula of $Al_2O_3 \times 5SiO_2 \times 6H_2O$. Crystal structure of bentonite consists of layers made of two tetrahedral silicon sheets fused to octahedral sheet of aluminum hydroxide. It has permanent negative charges that arise due to the isomorphous substitution of $Al^{3+}$ for $Si^{4+}$ in the tetrahedral layer and $Mg^{2+}$ for $Al^{3+}$ in the octahedral layer. This negative charge is balanced by the presence of exchangeable cations, for example, $Na^+$ or $Ca^{2+}$, in the lattice structure.

In one implementation, the clay is intercalated with an organic cation. For example, a metal cation in the clay structure may be replaced with an organic cation in a reaction known as a cationic-exchange reaction. To perform this reaction, a clay may be treated with a primary, secondary, or tertiary long-chain alkylamine or an alkylammonium cation. As a result of this treatment, hydrated metal cations within the clay are replaced with long-chain alkylamines or alkylammonium cations. In some cases, the long-chain alkyl amine is $C_{1-22}$ akylamine, $C_{6-22}$ akylamine, or $C_{6-22}$ akylamine, for example, methylamine, ethylamine, propylamine, isopropylamine, (ethyl)isopropylamine, butylamine, pentylamine, hexylamine, heptylamine, octylamine, nonylamine, decylamine, undecylamine, dodecylamine, or hexadecylamine. In some cases, the long-chain alkyl ammonium cation is $C_{1-22}$ akylammonium cation, $C_{6-22}$ akylammonium cation, or $C_{6-22}$ akylammonium cation, for example, methylammonium cation, ethylammonium cation, propylammonium cation, isopropylammonium cation, (ethyl)isopropylammonium cation, butylammonium cation, pentylammonium cation, hexylammonium cation, heptylammonium cation, octylammonium cation, nonylammonium cation, decylammonium cation, undecylammonium cation, dodecylammonium cation, or hexadecylammonium cation. For the cation exchange reaction, the clay may be treated with an organic amine or an organic ammonium cation in an aqueous solution. In one example, a long chain alkylamine may be mixed with an acid in water at about 50° C. to about 90° C., for a time period from about 1 hour to about 5 hours.

Mixing the polymer composition with clay without pre-modification of the clay with an organic cation may lead to poor dispersion of the clay in the polymer composition and, subsequently, may lead to voids and defects in the resultant coating on the metal surface. The cation exchange reaction and subsequent intercalation of the clay with the organic cations enhance dispersion of the modified clay in the polymer composition.

In one example, the polymer composition is an epoxy resin composition. As used in this disclosure, the term "epoxy resin" refers to polymers containing more than one epoxy group, also known as glycidyl group or oxirane group. In some implementations, the epoxy resin, or epoxy-containing polymer, is prepared from an epichlorohydrin and a compound containing at least two hydroxyl groups, for example, bisphenol A or bisphenol F. In some cases, the epoxy resin is a diglycidyl ether of bisphenol A (DGEBA), a diglycidyl ether of bisphenol F, a novolac epoxy resin, a cycloaliphatic epoxy resin, or a glycidylamine epoxy resin.

As described in this disclosure, the corrosion protection compositions may be prepared by mixing modified clay with epoxy resin composition at a temperature in a range of about 50° C. to about 90° C., for a time period from about 1 hour to about 5 hours, and then cooling the resultant composition to room temperature. In one example, bentonite clay modified with a hexadecylamine or a hexadecylammonium cation is mixed with an epoxy resin composition at about 70° C. for about 3 hours. In some implementations, the polymer composition is saturated with the modified clay. That is, clay structure in the polymer composition exhibits only intercalated structure and not exfoliated structure as determined, for example, by TEM analysis. In one example, an amount of clay modified with an organic cation is in a range of about 0.5 wt. % to about 10 wt. %, about 0.5 wt. % to about 5 wt. %, about 1 wt. % to about 5 wt. %, or about 1 wt. % to about 3 wt. %. In some cases, an amount of clay modified with an organic cation is about 1 wt. %, about 2 wt. %, about 3 wt. %, about 4 wt. %, or about 5 wt. %. In one implementation, the polymer composition is saturated with a clay modified with an organic cation, and an amount of clay in the polymer composition is about 3 wt. %. In some cases, having polymer composition saturated with the clay significantly improves corrosion protection properties of the composition when the composition is applied to a metallic surface.

In some implementations, corrosion protection composition of the present disclosure contains an amine hardener. The amine hardener may contain at least one or at least two amino ($NH_2$) groups. The amino groups in the hardener may react with the glycidyl groups of the epoxy resin, resulting in the crosslinking and hardening of the epoxy resin, for example, to form a coating. In one example, an amine hardener is diethylenetriamine, triethylenetetramine, diethylaminopropylamine, diproprenediamine, N-aminoethylpiperazine, isophoronediamine, m-xylenediamine, metaphenylene diamine, diaminodiphenylmethane, diaminodiphenylsulfone, or 4,4'-methylenedianiline. The corrosion protection composition may contain the hardener in an amount in a range of about 15 wt. % to about 30 wt. %, or about 15 wt. %, about 20 wt. %, about 25 wt. %, or about 30 wt. %.

In some implementations, corrosion protection composition of the present disclosure contains an organic solvent. Suitable examples of the organic solvent include xylene, toluene, benzene, cumene, and naphtha. An amount of the organic solvent in the corrosion protection composition may be in the range of about 5 wt. % to about 25 wt. %, or about 15 wt. %, about 20 wt. %, or about 25 wt. %.

In some implementations, corrosion protection composition of the present application may be used to protect a metal surface from corrosion. One example of a metal that could be protected from corrosion is an iron alloy, for example, steel. Suitable examples of steel include stainless steel, carbon steel, and steel containing Si, C, P, Mn, Cr, Ni, Mo, Ti, N, Co, or W, or any combinations of these elements. The metal surface may be coated with the corrosion protection composition. In some cases, the metal surface may be spray-coated, spin-coated, dip-coated, film-coated, roller-coated, or painted with the corrosion protection composition. The resultant coating on the metal surface can be of any desired thickness, for example, the coating may be 1 µm, 100 µm, 1 mm, 2 mm, 3 mm, or 5 mm thick. In some implementations, the resistance of the coating described in the present document is at least 100 times greater than the resistance of the coating prepared using the polymer composition containing no clay at all. In these implementations, the capacitance of the coating described in the present document is at least 100 times less that the capacitance of the coating prepared using the polymer composition containing no clay at all. In some cases, resistance of the coating on the metal surface is greater than about $1\times10^4$ $\Omega\cdot cm^2$, for example, the resistance of the coating is in a range of about $1\times10^8$ $\Omega\cdot cm^2$ to about $10\times10^8$ $\Omega\cdot cm^2$. In some cases, capacitance of the coating on the metal surface is less than about $1\times10^{-11}$ F, for example, the capacitance of the coating is in a range of about $1\times10^{-11}$ F to about $1\times10^{-11}$ F. Experiments described later were performed on a laboratory scale, but can be scaled to industrial levels using standard industry techniques, for example, to coat metal pipes with corrosion protection compositions of the present disclosure for oil field applications.

EXAMPLES

Materials and Methods

In this work, purified sodium-bentonite, hexadecylamine and HCl (37%) were used as materials and reagents. The polymer coating used in this work is diglycidyl ether of bisphenol A (DGEBA) epoxy resin containing approximately 20% xylene solvent and the an amine hardener which is 4,4'-methylenedianiline (MDA). The chemical composition of the carbon steel used in this study is (wt. %): C 0.08-0.13; Si 0.05; P 0.04; Mn 0.3-0.6; Fe balance. Two main different dimensions were designed for the samples used. Carbon steel panel with dimensions of 15 cm long and 7.5 cm wide, for the pull-adhesion and cathodic delamination tests, and a steel rod with a diameter of 1 cm for electrochemical impedance spectroscopy test.

The prepared nanocomposites were characterized by X-ray diffraction and transmission electron microscopy. Their corrosion resistance abilities, as coatings on carbon steel, were evaluated by electrochemical impedance spectroscopy, in 3.5% NaCl solution, at room temperature and compared to epoxy resin that does not contain clay.

Example 1—Preparation of Modified Bentonite

To modify bentonite using the cationic exchange reaction, the silicate layers within the bentonite were intercalated by using a solution containing alkylammonium cations as intercalating agents. Hexadecylamine was used to produce the modified bentonite (BH) based on the following procedure:

Two different solutions were prepared (S1 and S2). For S1, 5.75 g of hexadecylamine, 2.4 mL of HCl and 100 mL of deionized water were mixed and stirred for 1 h at 70° C. Thus, a solution with a concentration of 0.238M of the intercalating agent was prepared. For S2, 10 g of bentonite and 200 mL of deionized water were mixed and stirred for 3 h at 70° C. Then, the solution S1 was added dropwise to S2. The resultant mixture was then stirred for 1 h at 70° C. After that, the obtained white precipitate was filtered and then washed with 200 mL of hot water and filtered again. This process was repeated twice to make sure that the residue of the ammonium salt was completely removed.

X-Ray Diffraction Results

The XRD analysis was used to investigate the changes in the spacing between the silicate sheets inside the structure of bentonite and the degree of intercalation, as well as the agglomeration of non-reacted clay for prepared nanocomposites. Changes in the spacing after treating bentonite can be directly attributed to the effect of the intercalating agents. Moreover, after mixing the modified bentonite with the epoxy resin, any detected further changes indicate that the polymer diffused into the structure of bentonite.

During analysis of the XRD results, three main factors were carefully monitored: The position of the peak, the full width at half maximum of the peak and the intensity of the peak. Referring to FIG. 1, it can be noted that the scanning process was covering a range of 2θ from 0 to 12. This range shows reflection corresponding to the repeat distance perpendicular to the silicate layers. The XRD results showed a change in the basal diffraction in bentonite after the treatment process. Clearly, there is a shift in the peak position to a lower angle. At the same time, the new diffraction peak showed an increase in the intensity and a decrease in the peak width, which is a strong evidence of a decrease in the degree of coherent layer stacking and a more disordered system. The shift in 2θ indicates that hexadecylamine has interacted with bentonite to increase the spacing between the silicate layers from 11 to 20.4 Angstrom. Such findings reveal that the efficiency of hexadecylamine to intercalate the clay is about 85%. Moreover, the results suggest that the presence of hexadecylamine increased the internal structure order of bentonite.

Example 2—Preparation of Polymer-Clay Nanocomposite

Two different coatings were prepared and evaluated: (1) an epoxy coating and (2) epoxy coating treated with modified bentonite BH (CBH). The coating (1) was mixed with the hardener based on a ratio of 3:1 using a mechanical stirrer (200 rpm) for 10 min and then applied on steel samples, using paint sprayer, and cured at room temperature for 24 h. CBH (1%) coating (2) was prepared by mixing 21 g of the epoxy resin and 0.28 g of the modified bentonite at 70° C., under constant mechanical stirring for about 3 h. After that, the coating was left to cool to room temperature overnight while it was stirred using magnetic stirrer. Then 7 g of the hardener was added and the solution was mixed aggressively before being applied on the steel. The nanocomposites containing modified bentonite at 3 wt. % and 5 wt. % loading were prepared using the same mixing procedure with the same amount of resin used for the 1% CBH however the loading amount of modified bentonite were 0.84 g and 1.4 g, respectively. The nanocomposites containing modified bentonite at 2 wt. % and at 4 wt. % were prepared in a similar manner.

X-Ray Diffraction Results

Figure 2:
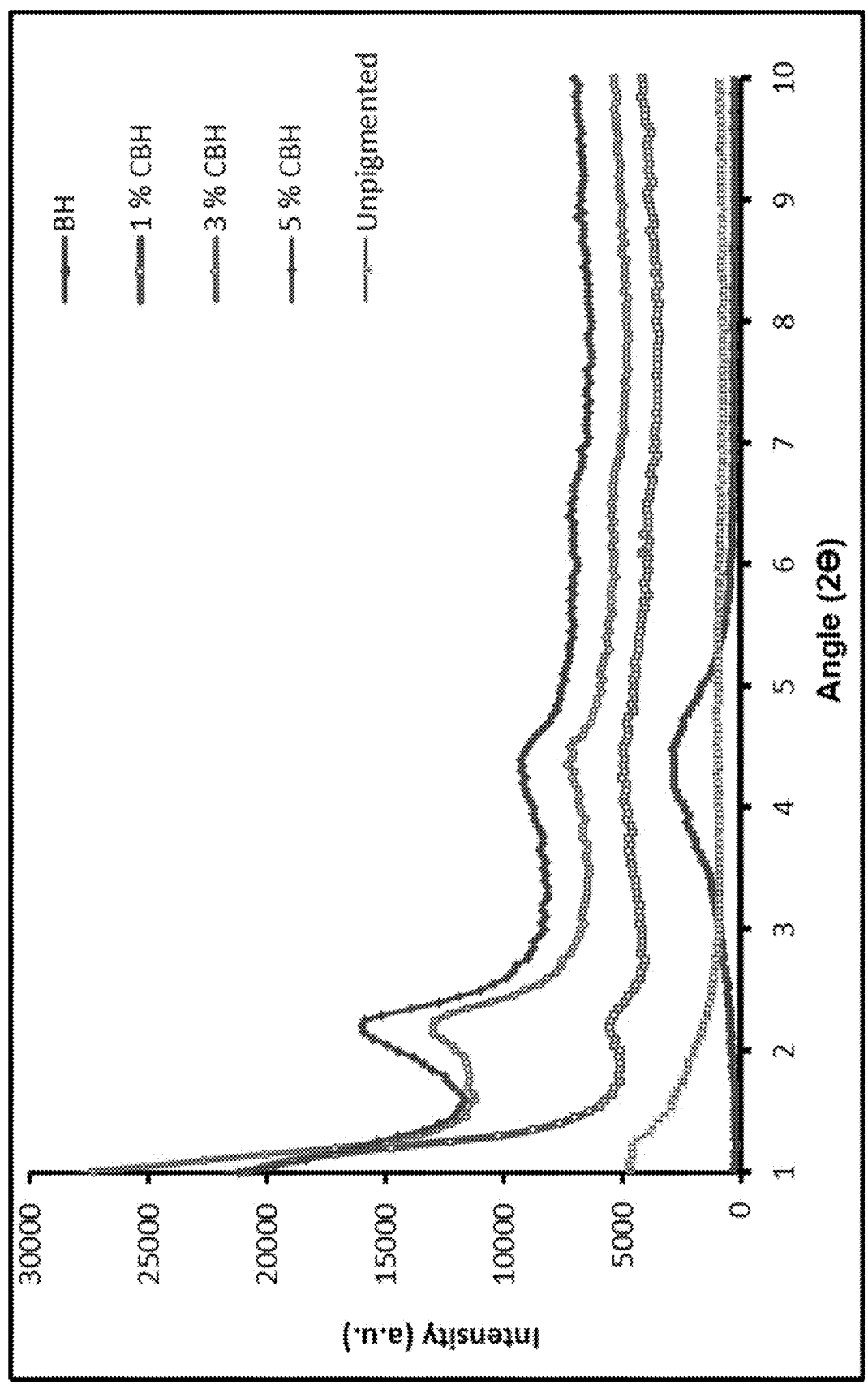
FIG. 2 contains line plots showing X-ray diffraction patterns for bentonite epoxy resin composites.

To study the changes in the internal structure of bentonite after mixing with epoxy resin, each coating was examined by XRD as shown in FIG. 2. In this experiment, only the clay inside the epoxy was detected and not the epoxy itself. As the results show, some of the treated clay was slightly intercalated and was present as phase 1, and an intercalated bentonite was observed inside the coating as phase 2. Referring to FIG. 2, 1 wt. %, 3 wt. %, and 5 wt. % nanocomposites showed two different diffraction peaks at the same positions. The first peak is at 2θ of 4.5°, which is very close to the diffraction peak shown by the treated bentonite. This showed that the clay inside the coating was slightly intercalated by the epoxy. At 2θ of 2.3°, stronger peaks were observed for each coating indicating that the epoxy was involved in an intercalation process to the clay and these peaks got stronger as the clay loading increased. Based on these results, there are three main phases inside the coating. These are: (1) the slightly intercalated clay, (2) the intercalated clay that could be seen by the XRD, and (3) possibly the exfoliated clay that could not be seen by the XRD.

Transmission Electron Microscopy (TEM)

Figure 3:
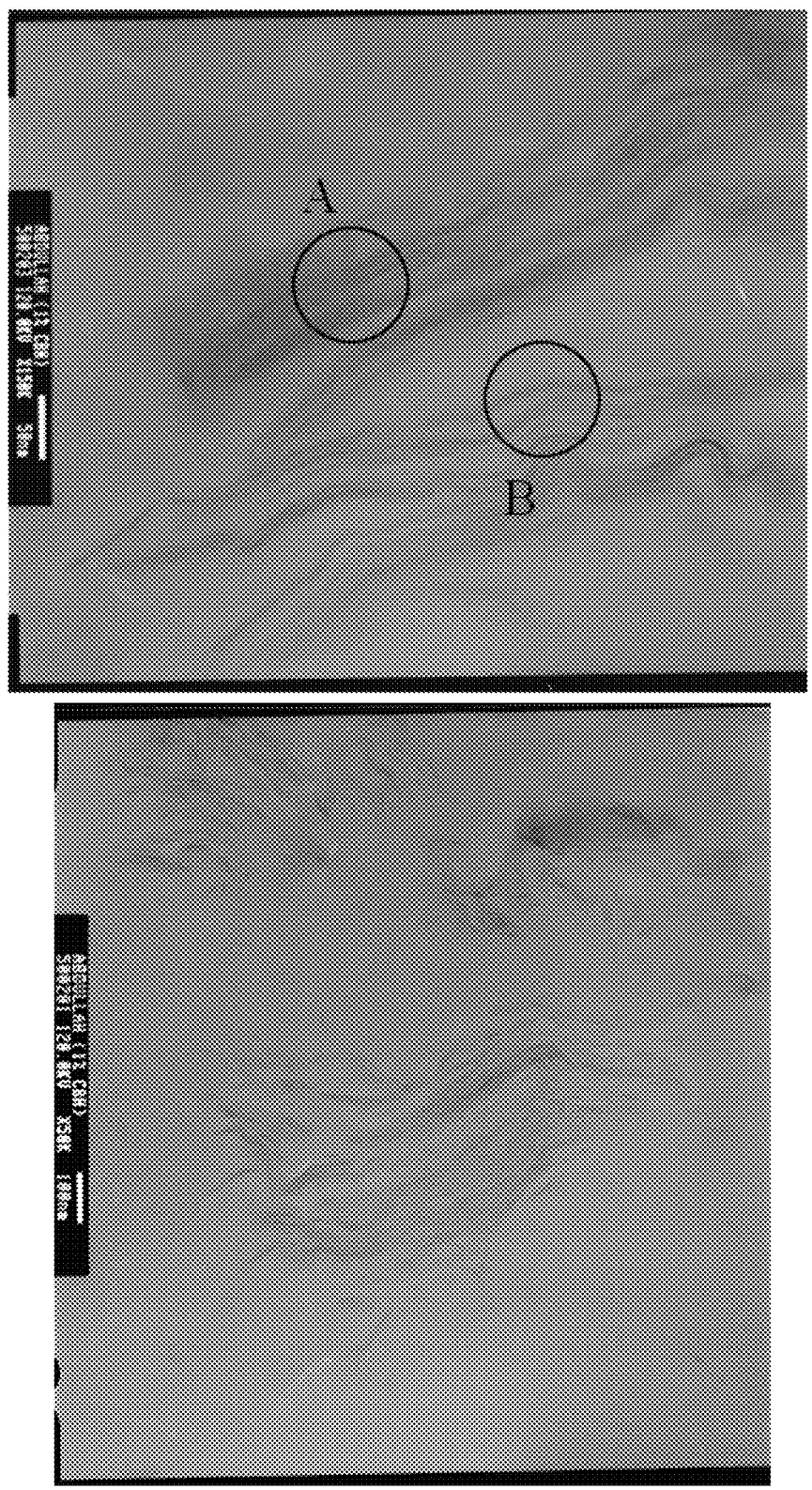
FIG. 3 contains TEM images for 1 wt. % CBH, 50 nm and 100 nm.
Figure 4:
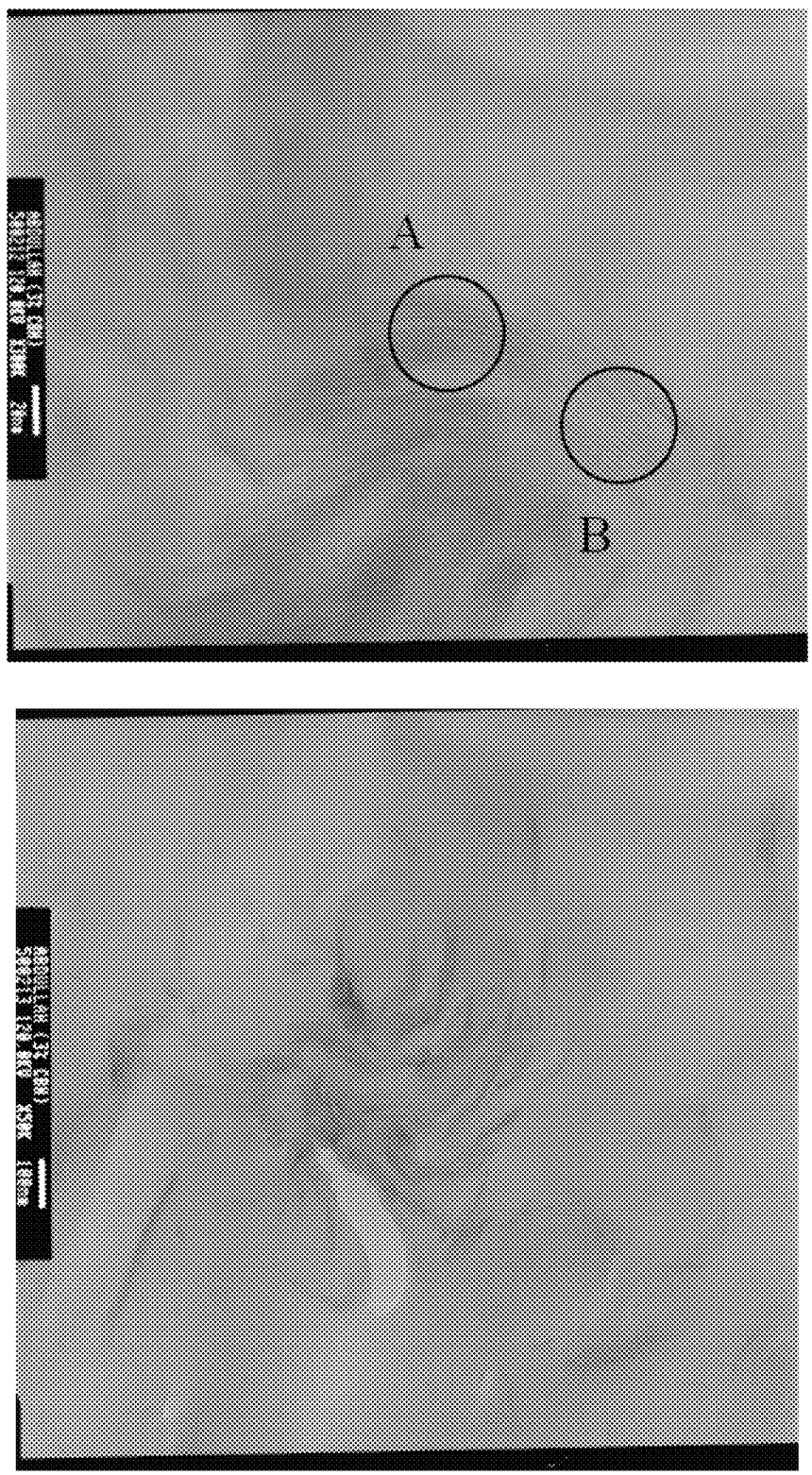
FIG. 4 contains TEM images for 3 wt. % CBH, 50 nm and 100 nm.
Figure 5:
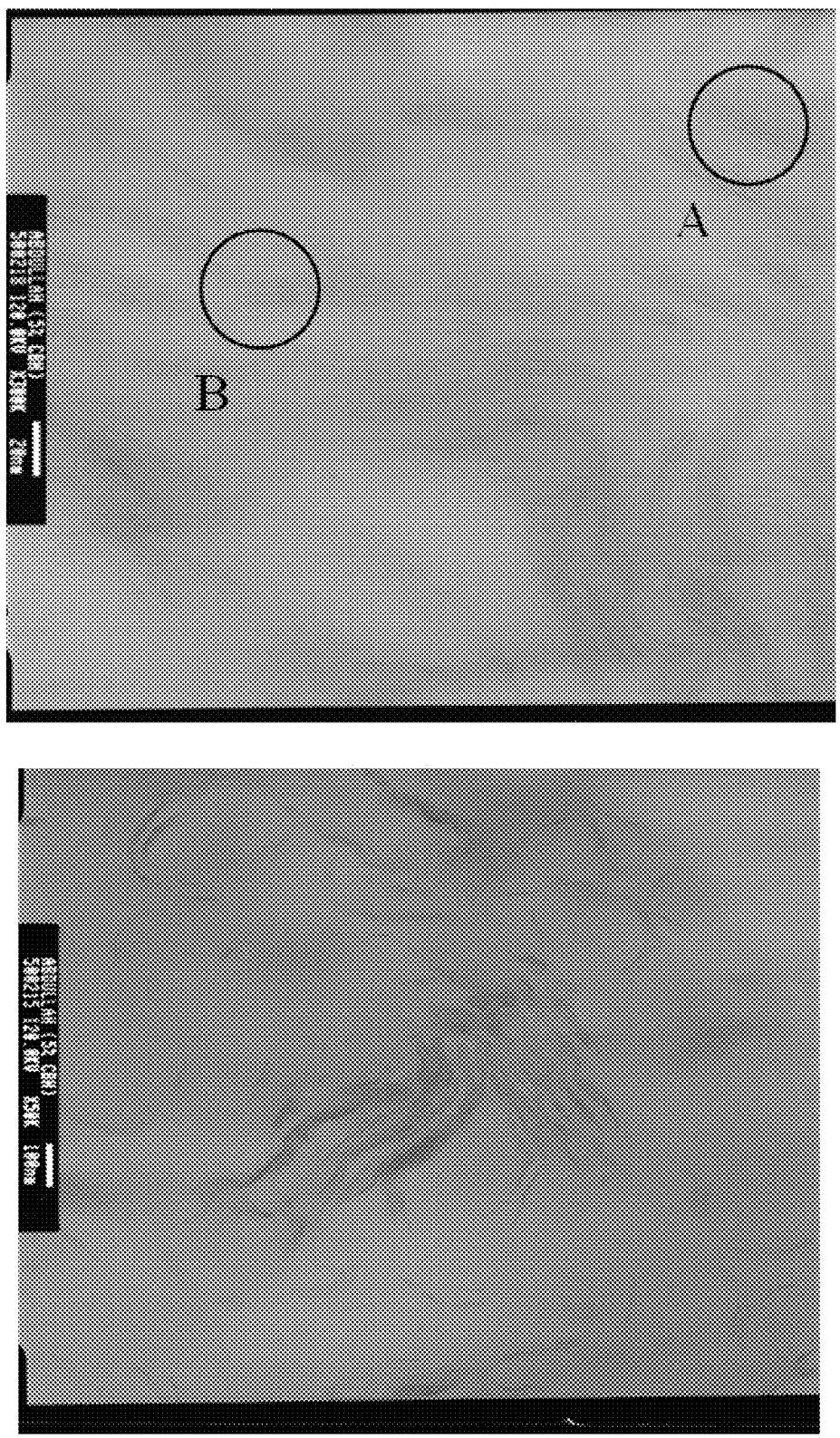
FIG. 5 contains TEM images for 5 wt. % CBH, 50 nm and 100 nm.

TEM was used to determine the dispersion level of Bentonite in the nanocomposites. FIGS. 3, 4 and 5 show the TEM micrographs of 1 wt. %, 3 wt. % and 5 wt. % nanocomposites. The presence of silicate layers was evident in the TEM images with different degree of intercalation. For 1 wt. % nanocomposites (FIG. 3), two areas are highlighted namely, area A and area B. The spacing in area A is about 4 nm (as detected by the XRD, while in area B the spacing is about 10 nm (this was not detected by the XRD, such large spacing might be beyond the capability of the XRD system). For both 3 wt. % CBH and 5 wt. % CBH (FIGS. 4 and 5), the same behavior was observed. It is also noticed that exfoliated phase was detected in the case of 5 wt. % CBH.

Example 3—Coating Properties and the Corrosion Process: Electrochemical Impedance Spectroscopy (EIS)

Figure 6:
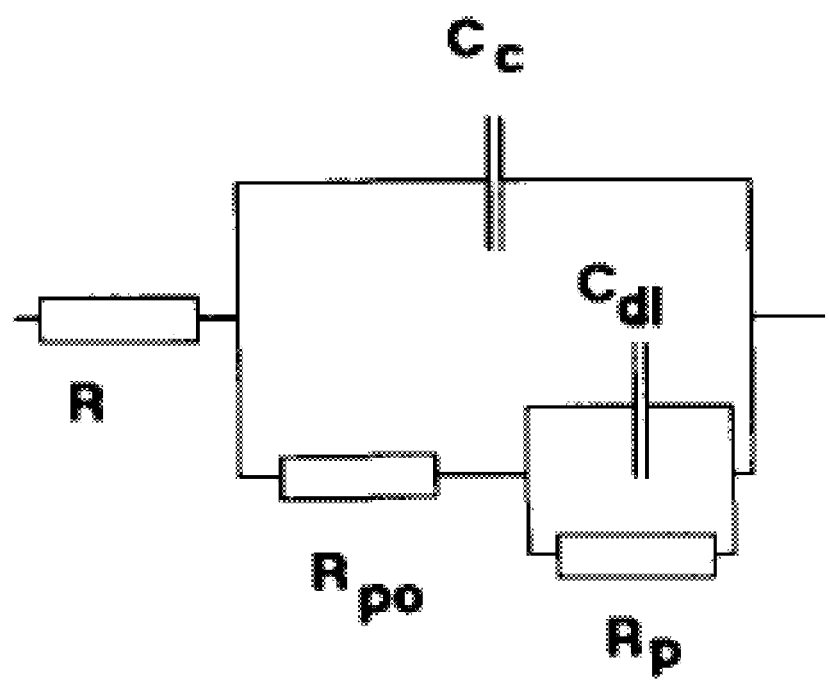
FIG. 6 contains an image of an equivalent circuit for coated sample.

The coating properties and the corrosion process under the coating were evaluated using Electrochemical Impedance Spectroscopy (EIS). The pore resistance values obtained by the EIS data provide information about the permeability of the coating while charge transfer resistance values provide information about any corrosion activities under the coating. The EIS technique produces data that can be translated to an electrical circuit known as the equivalent electrical circuit. Each component in this electrical circuit gives an explanation that describes the coating system. This circuit is composed of the electrolyte resistance; followed by a capacitance (coating capacitance Cc) in parallel with a resistance (the coating or pore resistance Re). This model also includes another electrical circuit that represents the electrochemical process at the polymer-metal interface as shown in FIG. 6. This equivalent circuit simulates a coated sample immersed in a solution.

Figure 7:
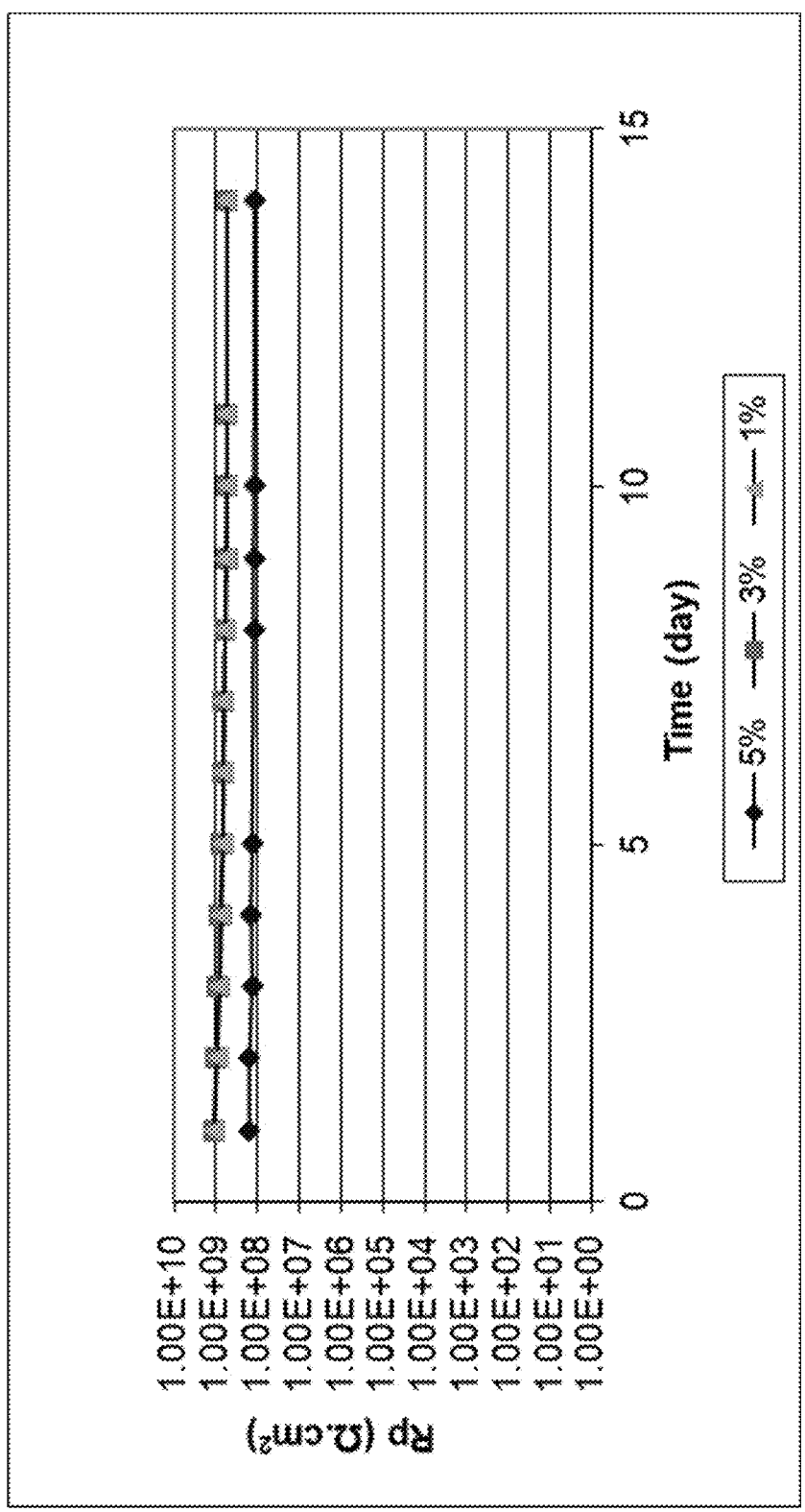
FIG. 7 contains line plots showing EIS data showing the $R_p$ values for steel samples coated with an epoxy resin.
Figure 8:
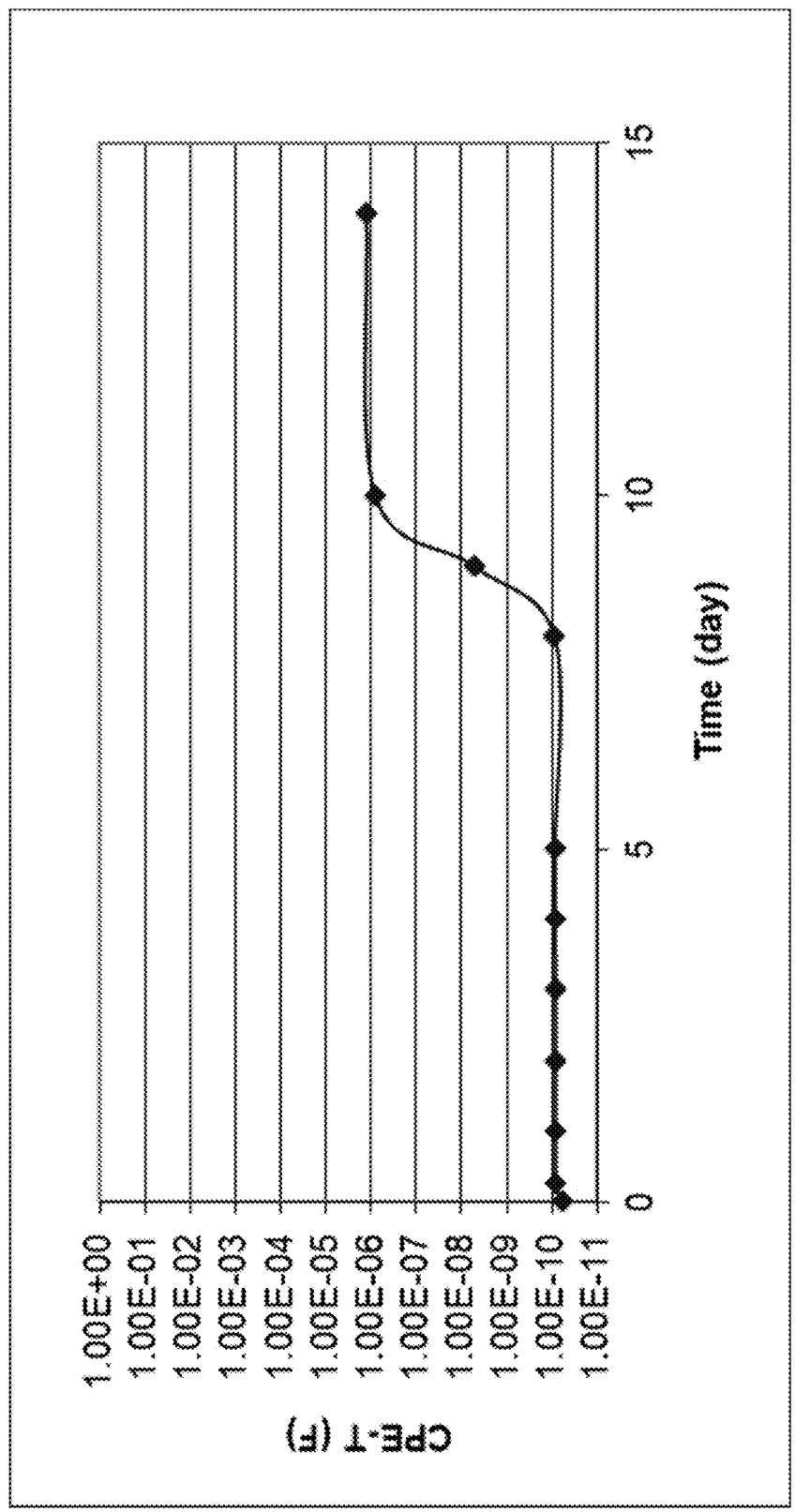
FIG. 8 contains a line plot showing EIS Data showing the capacitance values for steel coated with an epoxy resin.

Three carbon steel samples coated with epoxy resin were immersed in 3.5% NaCl solution for 14 days. The EIS data was recorded during this period and FIGS. 7 and 8 summarize the results. EIS data for untreated epoxy resin coating is shown in FIG. 8. EIS data for steel samples coated with 1 wt. %, 2 wt. %, 3 wt. %, 4 wt. %, and 5 wt. % CBH composites is shown in FIG. 7. As can be seen from these results, the pore resistances of the CBH composite coatings have high values, which shows that the coatings offer a good protection. These results are confirmed by measuring the coating capacitance, which is an indicator of the water uptake by the coating. This parameter can be measured by Brasher-Kingsbury equation. The coating water uptake is an indication of the amount of water in the coating as a result of water penetration during service life of a coating system. As can be seen in FIG. 8 for the untreated epoxy coating, after eight days, the pore resistance decreased with immersion time. This shows that water is diffusing through the coating via voids and pores, and has reached the steel surface leading to degradation of the coating. Presence of water in the coating creates a suitable path for ions to move through, which leads to increasing the ionic conductivity of the coating. The corrosion process starts under the coating, and causes detachment of the coating for the steel surface. This detachment further introduces stresses in the coating, leading to generating defects in the coating. These defects, in turn, allow more water and oxygen to flow to the surface, causing more corrosion.

Figure 9:
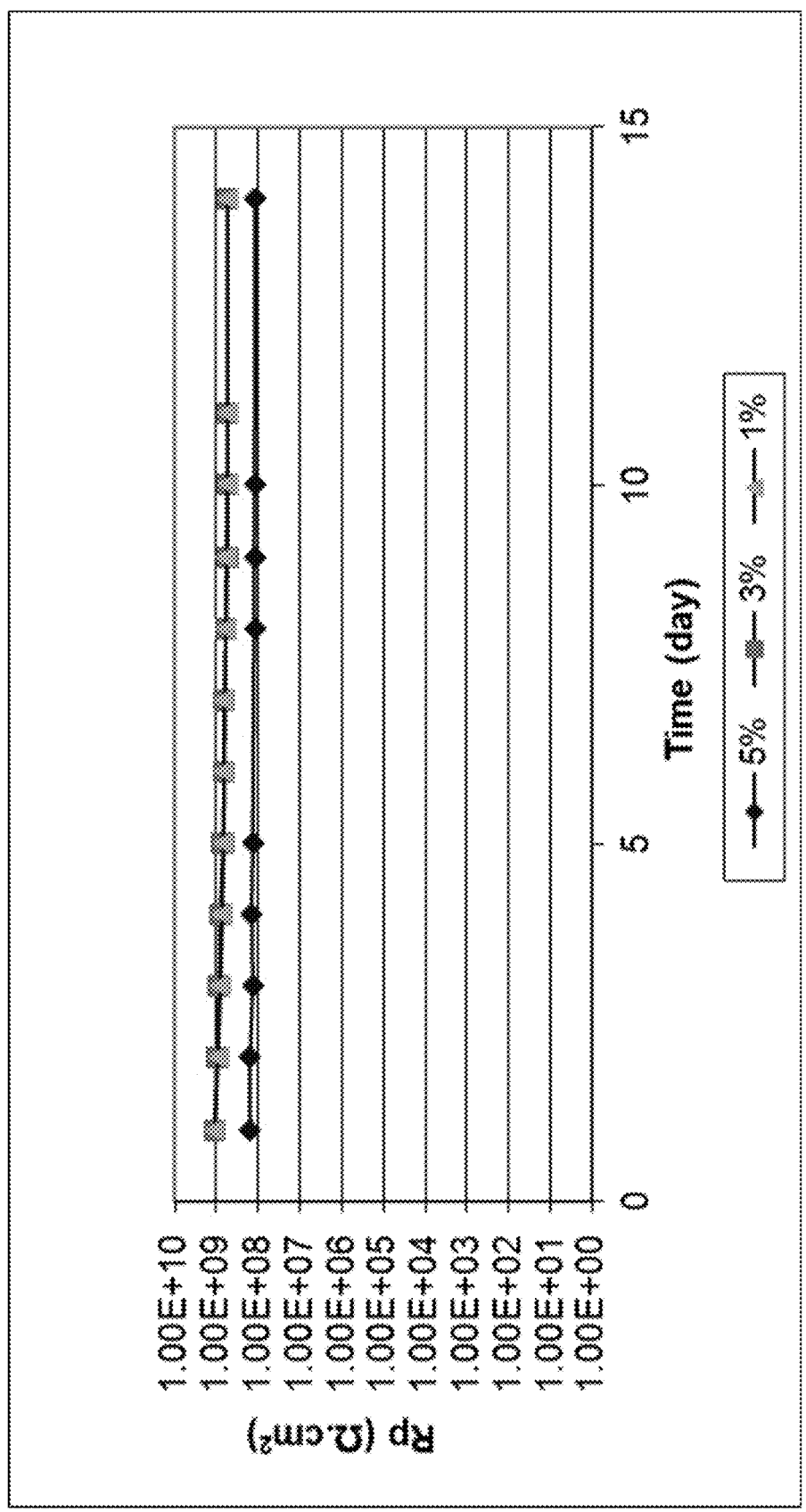
FIG. 9 contains line plots showing EIS data showing the $R_p$ values for steel samples coated with 1 wt. %, 3 wt. %, and 5 wt. % CBH composites.
Figure 10:
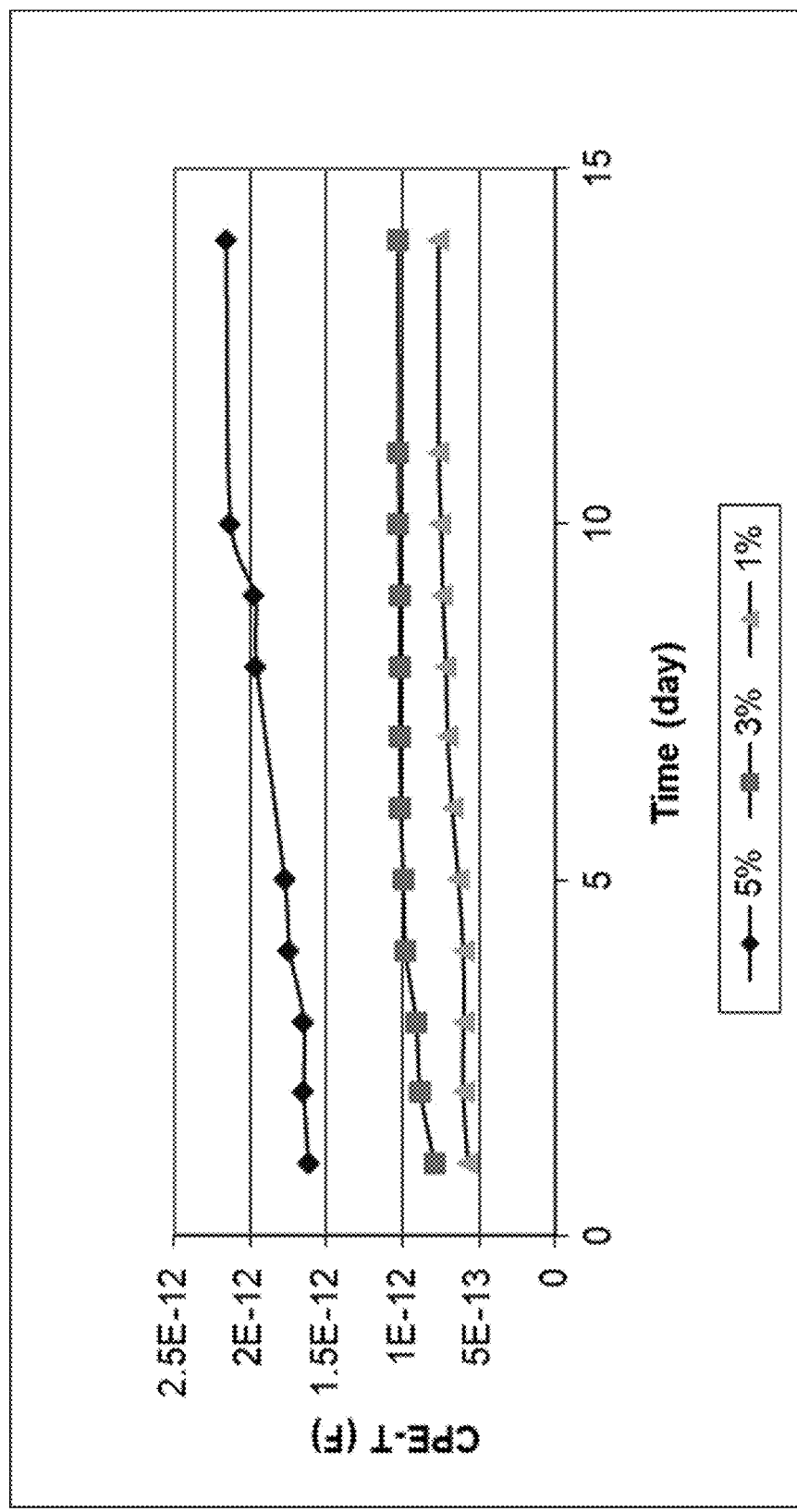
FIG. 10 contains line plots showing EIS data showing the capacitance values for steel samples coated with 1 wt. %, 3 wt. %, and 5 wt. % CBH composites.

In sharp contrast, after introducing the modified bentonite to epoxy coating, there was a noticeable improvement in the coating resistance values. FIGS. 9 and 10 show that the coating systems with three different loadings of composite sustained a high resistance during two weeks of exposure with minimum water uptake. Such results confirmed that the silicate nano-layers have acted as physical barriers, reducing the diffusion rates of water to reach the surface. The results show that introducing a composite to the resin played a major role in improving the corrosion protection of the coating. To confirm the significantly improved performance of the modified coatings, each system was kept in a solution for 40 days and results are summarized in Table 1.

TABLE 1

EIS data for the coatings after 40 days of exposure

| Coatings System | Resistance ($\Omega \cdot cm^2$) | Capacitance (F) |
|---|---|---|
| untreated epoxy | $5.60 \times 10^3$ | $4.00 \times 10^{-4}$ |
| 1 wt. % CBH | $4.5 \times 10^8$ | $1.04 \times 10^{-10}$ |
| 2 wt. % CBH | $4.8 \times 10^8$ | $1.01 \times 10^{-10}$ |
| 3 wt. % CBH | $5.60 \times 10^8$ | $9.65 \times 10^{-11}$ |
| 4 wt. % CBH | $3.8 \times 10^8$ | $2.9 \times 10^{-10}$ |
| 5 wt. % CBH | $1.60 \times 10^8$ | $5.00 \times 10^{-10}$ |

As can be seen in Table 1, all the samples coated with Bentonite-nanocomposites showed a noticeable performance compared to the untreated epoxy resin after 40 days of exposure confirming the effect of the nano-layers within the epoxy resin.

Figure 13:
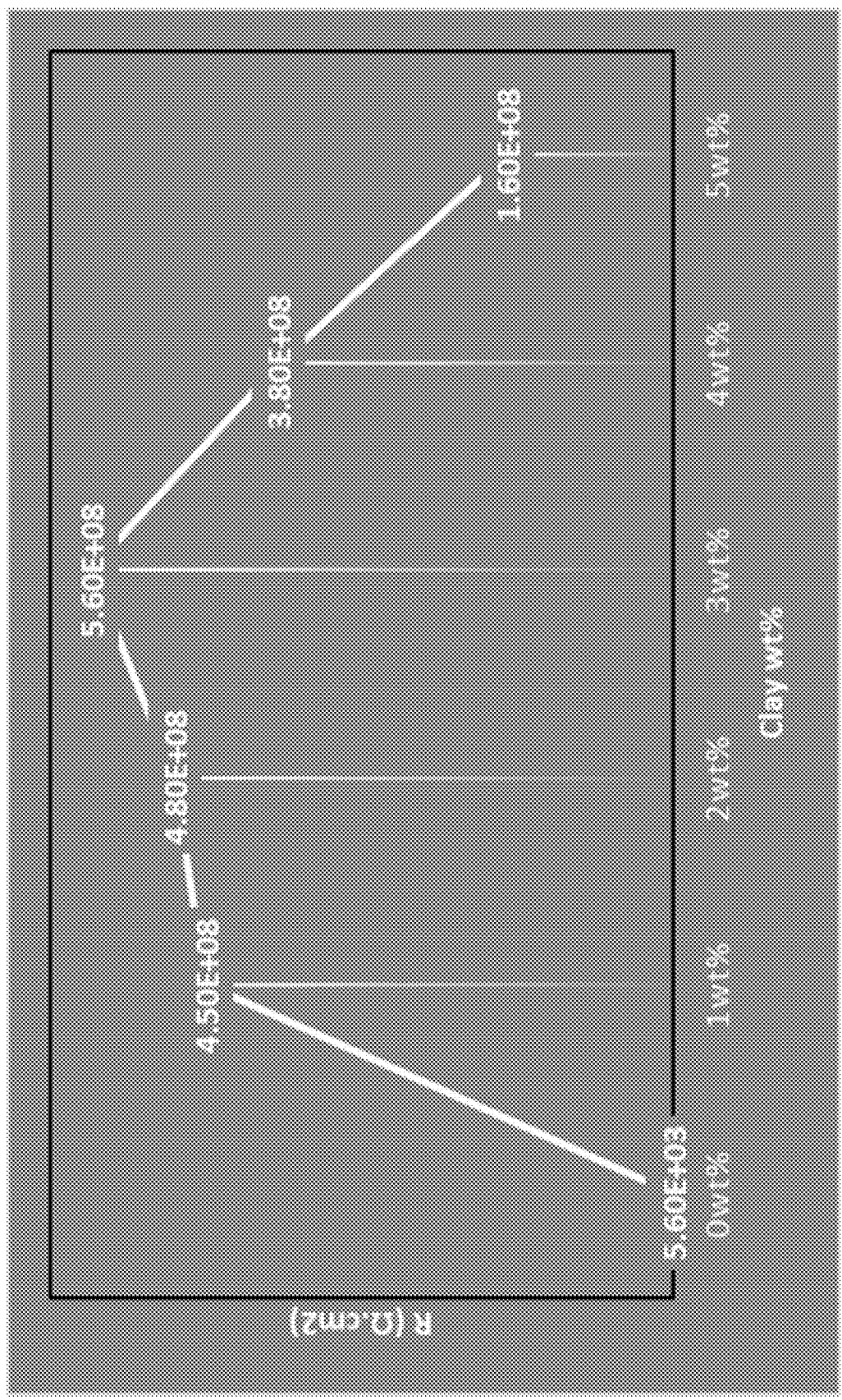
FIG. 13 contains a line plot showing the resistance of coated samples after 40 days of immersion in corrosive solution.
Figure 14:
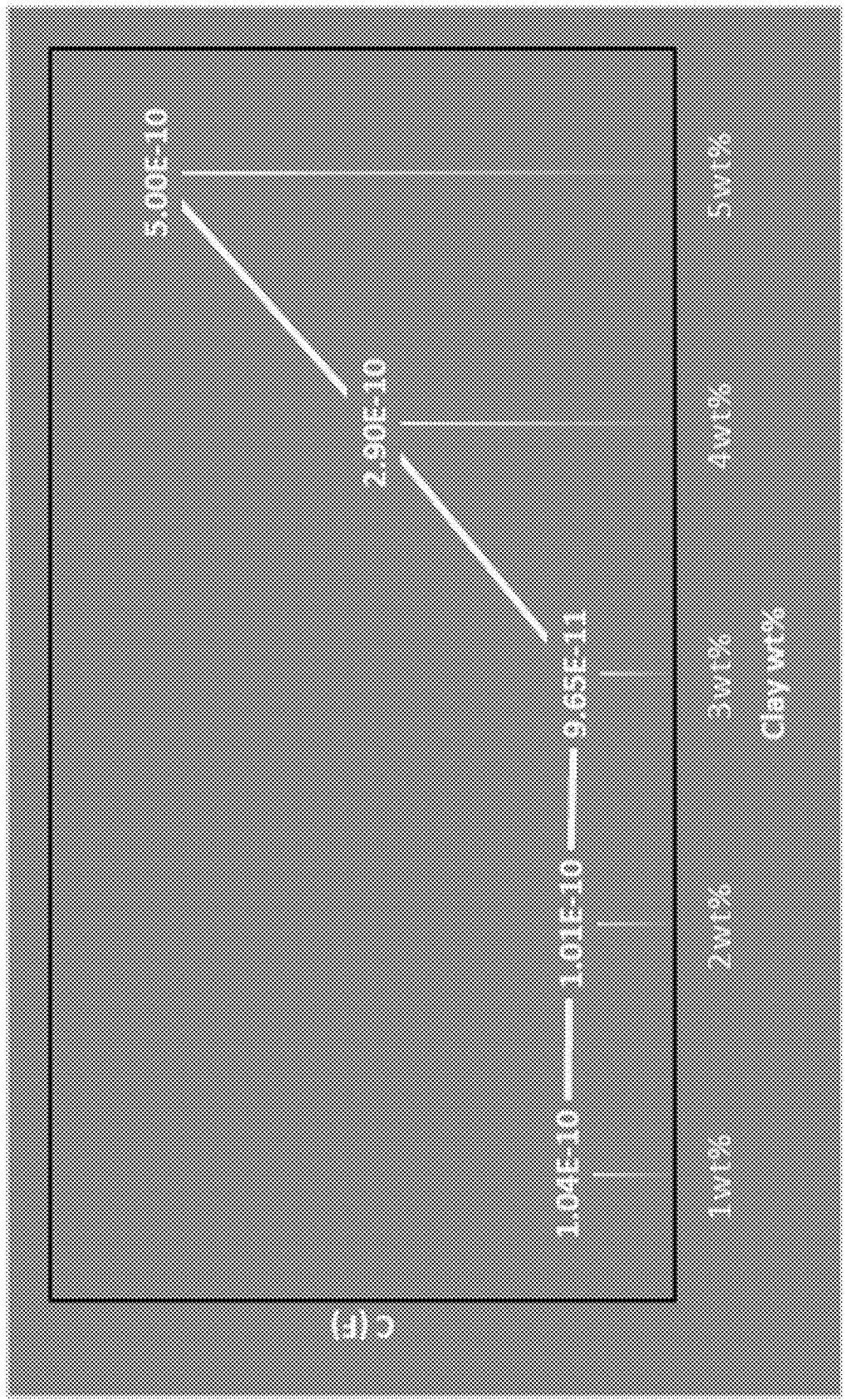
FIG. 14 contains a line plot showing the capacitance of coated samples after 40 days of immersion in corrosive solution.

Importantly, samples coated with 3 wt. % CBH showed the best performance compared to the other samples coated with epoxy resins containing 1 wt. %, 2 wt. %, 3 wt. %, 4 wt. %, and 5 wt. % BH. These results are illustrated in FIGS. 13 and 14. The superior performance of the 3 wt. % CBH is tied to the fact that at about 3 wt. % of clay in the epoxy resin, the resin is saturated with the clay. For example, 2 wt. % clay loading into the polymer results in morphology dominated by disorder intercalation with some exfoliated structure, which shows that the composite is not fully saturated. In contrast, as shown by TEM analysis discussed in Example 2, the epoxy resin with 3 wt. % clay loading exhibited only intercalated structure, and the exfoliated structure appears again only at higher loadings, such as 5 wt. %. The saturation of resin with clay was further confirmed by the XRD analysis, where three main phases were noted inside the composite sample.

Example 4—Coating Properties and the Corrosion Process: Cathodic Disbondment

Figure 11:
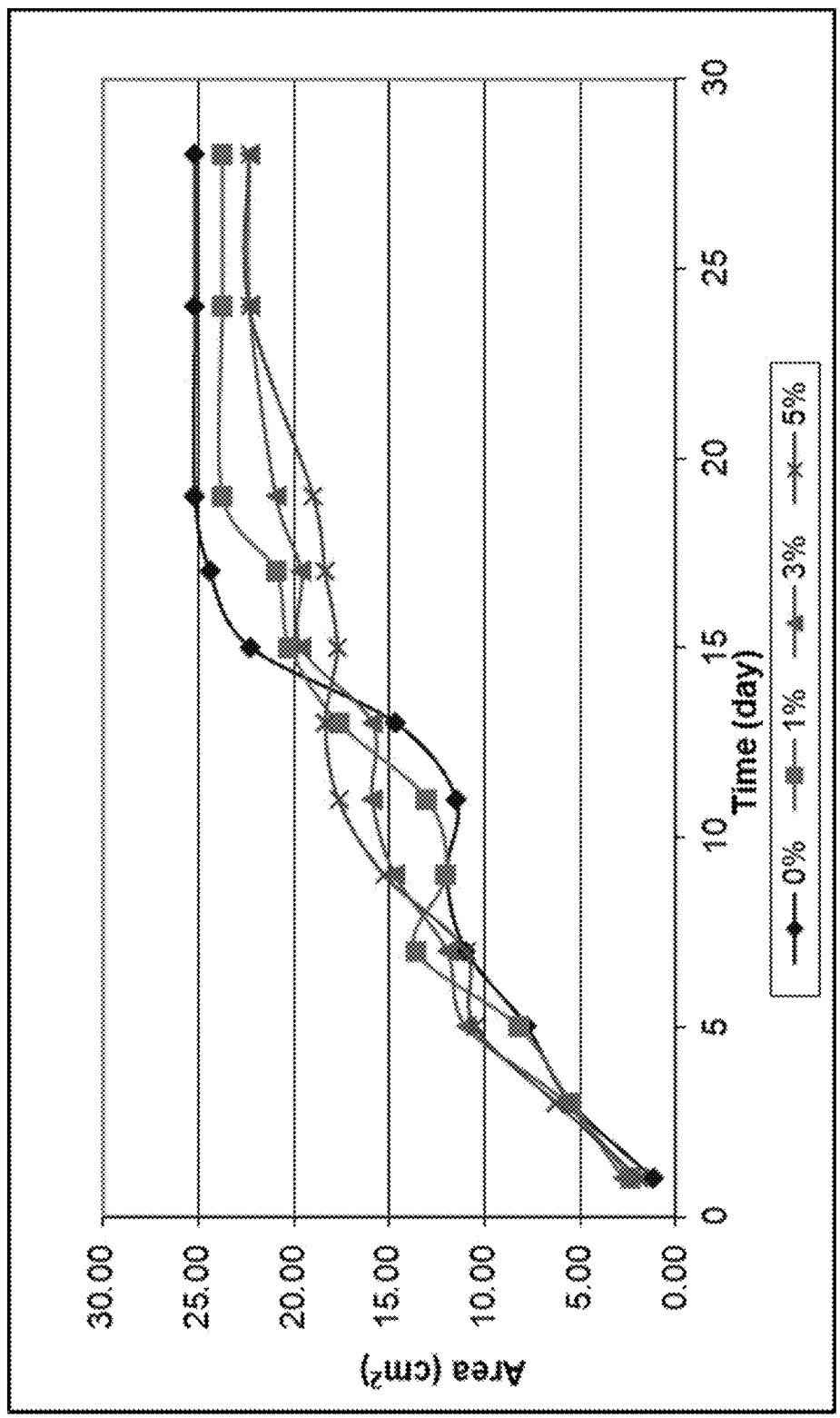
FIG. 11 contains line plots showing cathodic disbondment results for steel samples coated with 1 wt. %, 3 wt. %, and 5 wt. % CBH composites.

All coatings were subjected to a cathodic disbondment experiment. FIG. 11 shows the results obtained. Cathodic disbondment (delamination) is caused by the hydroxyl ions at the interface of the steel surface and the coating. In this experiment, the coated samples were immersed in 3.5% NaCl and a potential of −1.05V was applied. In general, under these conditions, hydroxyl ions are generated and then diffuse through the defects in the coating and reach the metal/polymer interface. The hydroxyl ions create higher alkalinity, and interact with the bonds between the coating and the metal, weakening and breaking the bonds. Adding bentonite to the coating is not expected to change the character of the polymer-metal bonding and the type of bonds between the coating and the metal. Furthermore, the clays will not chemically react with hydroxyl ions to reduce the alkalinity. Accordingly, all coating systems (untreated, 1 wt. %, 3 wt. %, 5 wt. % CBH coatings) showed comparable results in delamination experiment, with some improvement in the cathodic disbondment for the composite coatings as compared to untreated coatings.

Example 5—Coating Properties and the Corrosion Process: Pull-Off Adhesion

Figure 12:
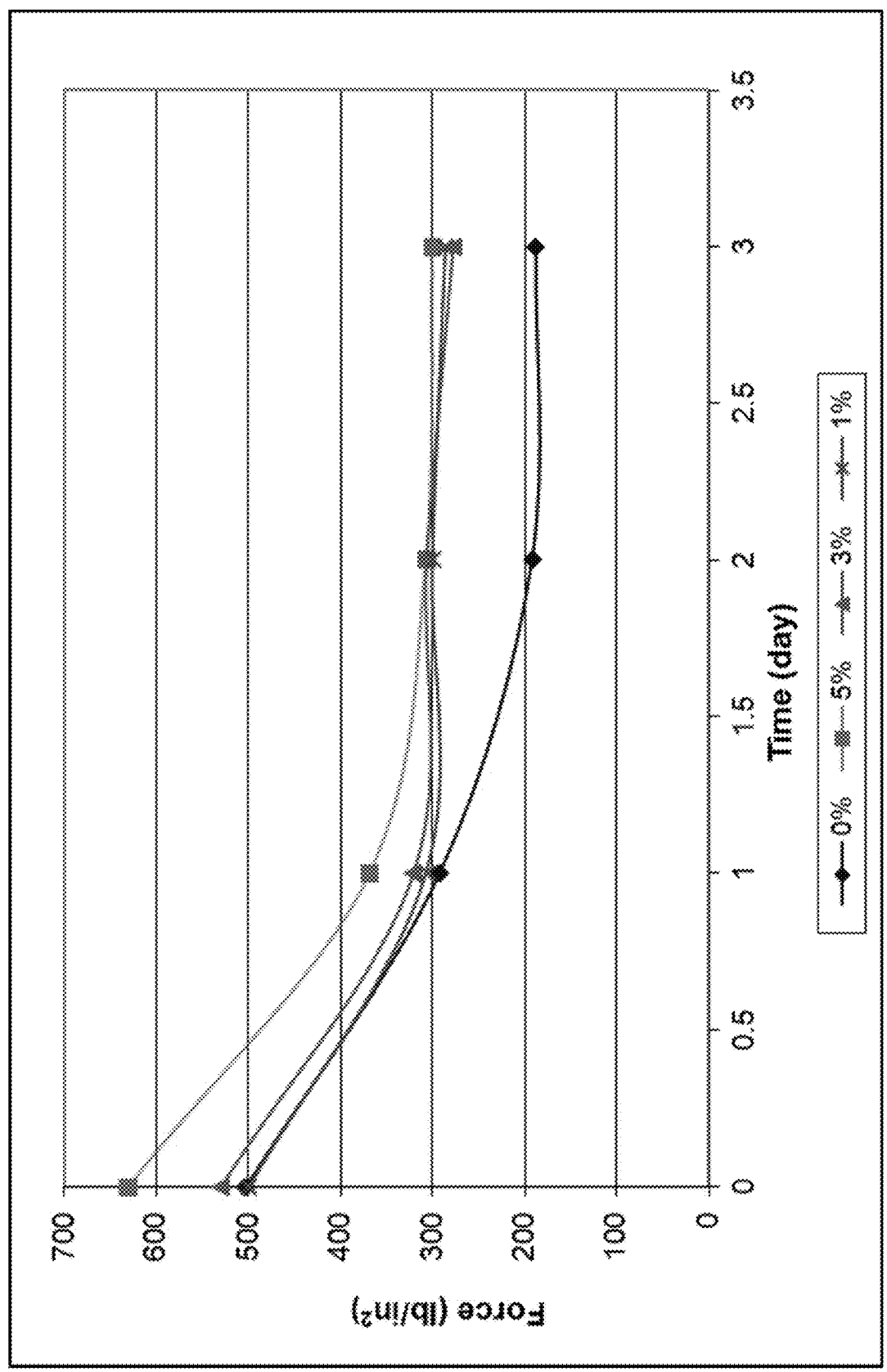
FIG. 12 contains line plots showing pull-off adhesion results for steel samples coated with 1 wt. %, 3 wt. %, and 5 wt. % CBH composites.

Coating adhesion is one of the most important properties that determine the coating quality. Losing adhesion will eliminate the purpose of having the coating based on the fact that the good coating should attach to the metal, to prevent any significant amount of corrosive species, such as oxygen and water reaching the metal surface and starting a corrosion process. The adhesion performance of each coating was evaluated by using the Pull-Off Adhesion Experiment. FIG. 12 shows the data obtained.

Results of this test directly correlate with the EIS data (Example 3). The water uptake observed in the EIS data can provide direct explanation for the adhesion data obtained. The following findings summarizes the adhesion behavior of the coatings.

In dry conditions, all CBH coatings showed better adhesion compared to the untreated epoxy. As can be seen in FIG. 12, during the immersion time, the coatings started to absorb water, leading to weakening of the chemical bonds at the metal/polymer interface. Generally, after the first few days, the presence of water at the interface does not cause rapid under-film corrosion. The amount of water necessary to cause interfacial loosening is substantially less than the amount required to form a discrete aqueous phase. This thin layer of water, possibly only a monolayer, would have a low dielectric constant that is insufficient to support the charge transfer process associated with corrosion. Based on the EIS data, the prepared composites showed low water uptake during immersion, which explains the variation in the adhesion values shown in FIG. 12 for the CBH coatings as compared to the epoxy resins without the clay.

In sum, the Examples demonstrate that incorporation of bentonite modified with hexadecylamine in the epoxy resin-based coatings resulted in the development of epoxy/bentonite composites with intercalated structures. The corrosion protection performance of these composites has been evaluated by standard electrochemical corrosion testing techniques. The results revealed that the presence of modified clay has significantly improved the corrosion protection provided by epoxy resin. To achieve high level of protection, clay has to be treated with a long-chain alkylamine prior of being mixed with the resin.

As the experimental results show, resistance and capacitance were significantly improved by addition of 1 wt. % of clay into the epoxy resin. The coating resistance increased from $5.60 \times 10^3$ $\Omega \cdot cm^2$ for epoxy with 0 wt. % clay to $4.5 \times 10^8$ $\Omega \cdot cm^2$ for epoxy with 1 wt. % clay. Similar patterns were observed for the capacitance values, the epoxy with 0 wt. % clay has a capacitance value of $4.00 \times 10^{-4}$ F while epoxy with 1 wt. % clay has a significantly improved capacitance of $1.04 \times 10^{-10}$ F. Both resistance and capacitance properties continued to steadily improve as the clay loads increased up to 3 wt. %. When the epoxy resin contained no clay at all, as the immersion test shows, water was diffusing through the coating via voids and pores, reaching the surface and leading to degradation of the coating. The noticeable improvement in corrosion resistance due to clay addition may be attributed to the additional barrier to water flow that is created by clay layers, and to the decrease in ion conductivity of the coating caused by the clay addition.

Importantly, amount of clay has a significant influence on the performance of the coating. As the results described in this application show, 3 wt. % of amine-modified bentonite in the epoxy resin led to better corrosion protection, as compared to resins containing 1 wt. %, 2 wt. %, 4 wt. %, and 5 wt. % of clay. The superior performance of the 3 wt. % clay composite may be attributed to the saturation of the resin with the clay at this loading level, which was confirmed by both XRD the TEM analyses. Corrosion resistance for 4 wt. % and 5 wt. % clay loadings decreased when compared to the 3 wt. % loading due to the oversaturated resin matrix. Yet, the composites with 4 wt. % and 5 wt. % clay loads afforded significantly better corrosion protection compared to resin with no clay at all.

REFERENCES

1. D. A. Jones, Principles and prevention of corrosion, Second Edition, Prentice Hall, New Jersey, 1996.
2. Z. W. Wicks, Jr., F. N. Jones, S. P. Pappas, D. A. Wicks, Organic Coating: Science and Technology Third ed. 2007, Hoboken, N.J, USA: John Wiley and Sons.
3. D. Greenfield, J. D. Scantlebury, The protective action of organic coatings on steel, J. Corros. Sci. Eng. 2000, 3, paper 5.
4. J. M. Sykes, E. P. Whyte, Behaviour of a zinc-iron bimetallic couple coated with poly-vinyl butyral lacquer during intermittent exposure to salt solution. Corros. Sci. 49 (2007) 3361-3380.
5. J. E. Mayne, D. J. Mills, The effect of the substrate on the electrical resistance of polymer film. Oil Col. Chem. Accoc. 58 (1975) 155-159.
6. J. E. O. Mayne, J. D. Scantlebury, Ionic conduction in polymer films: II. Inhomogeneous structure of varnish films, Brit. Polym. J. 2 (1970) 240-243.
7. W. Funke, V. Arslanov, The effect of water on the adhesion of organic coating on aluminium. Prog. Org. Coat. 15 (1988) 355-363.
8. W. Funke, Problems and progress in organic coatings science and technology, Prog. Org. Coat. 31 (1997) 5-9.
9. R. M. Barrer, Diffusion in and through solids, Cambridge: Cambridge University Press, 1951.
10. J. A. Brydson, Pllastics Materials. Fourth Edition, London, 1982.
11. F. Wong, R. G. Buchheit, Utilizing the structural memory effect of layered double hydroxides for sensing water uptake in organic coatings. Prog. Org. Coat. 51 (2004) 91-102.
12. S. S. Raya, K. Yamadab, M. Okamotoa, Y Fujimotoa, A. Ogamib, K. Uedab, New polylactide/layered silicate nanocomposites. 5. Designing of materials with desired properties. Polymer, 44 (2003) 6633-6646.
13. S. S. Ray, M. Okamoto, Polymer/layered silicate nanocomposites: a review from preparation to processing. Prog. Polym. Sci. 28 (2003) 1539-1641.
14. Y-H. Yu, J.-M. Yeh, S.-J. Liou, C.-L. Chen, D.-J. Liaw, H.-Y Lu, Preparation and properties of polyimide-clay nanocomposite materials for anticorrosion application. J. Appl. Polym. Sci. 92 (2004) 3573-3582.
15. O. Khayankarn, R. Magaraphan, J. W. Schwank, Adhesion and permeability of polyimide-clay nanocomposite films for protective coatings. J. Appl. Polym. Sci. 89 (2003) 2875-2881.
16. J. M. Yeh, C. P. Chin, S. Chang, Enhanced corrosion protection coatings prepared from soluble electronically conductive polypyrole-clay nanocomposite materials. J. Appl. Polym. Sci. 88 (2003) 3264-3272.
17. J.-M. Yeh, S.-J. Liou, C.-Y. Lai, P.-C. Wu, Enhancement of corrosion protection effect in polyaniline via the formation of polyaniline-clay nanocomposite materials. Chem. Mater. 13 (2001) 1131-1136.
18. B. Lepoittevin, N. Pantoustier, M. Devalckenaere, M. Alexandre, C. Calberg, R. Jérôme, C. Henrist, A. Rulmont, P. Dubois, Polymer/layered silicate nanocomposites by combined intercalative polymerization and melt intercalation: a masterbatch process. Polymer, 44 (2003) 2033-2040.
19. C. Chena, M. Khobaib, D. Curliss, Epoxy layered-silicate nanocomposites. Prog. Org. Coat. 47 (2003) 376-383.
20. Khayankarn, O., R. Magaraphan, J. W. Schwank, Adhesion and permeability of polyimide-clay nanocomposite films for protective coatings. J. Appl. Polym. Sci. 89 (2003) 2875-2881.
21. R. A. Vaia, E. P. Giannelis, Polymer melt intercalation in organically modified layered silicates: model predictions and experiment. Macromolecules 30 (1997) 8000-8009.
22. T. J. Pinnavaia, G. W. Beall, Polymer-Clay Nanocomposites. John Wiley & Sons, Ltd.: Chichester, 2000.
23. F. Dellisanti, G. Valdre, Study of structural properties of ion treated and mechanically deformed commercial bentonite. Appl. Clay Sci. 28 (2005) 233-244.
24. R. L. Frost, L. Rintoul, Lattice vibrations of montmorillonite: an FT Raman and X-ray diffraction study. Appl. Clay. Sci. 11 (1996) 171-183.
25. P. L. Bonora, F. Deflorian, L. Fedrizzi, Electrochemical impedance spectroscopy as a tool For investigating underpaint corrosion. Electrochim. Acta, 41 (1996) 1073-1082.
26. Z. Ranjbar, S. Moradian, M. R. M. Z. Attar, EIS Investigation of cataphoretically electrodeposited epoxy coatings having different EEWs. Prog. Org. Coat. 51 (2004) 87-90.
27. D. M. Brasher, A. H. Kingsbury, Electrical measurements in the study of immersed paint coatings on metal. I. Comparison between capacitance and gravimetric methods of estimating water-uptake. J. Appl. Chem. 4 (1954) 62-72.
28. J. M. Sykes, A variant of the Brasher-Kingsbury equation. Corros. Sci. 46 (2004) 515-517.
29. E. Huttunen-Saarivirta, G. V. Vaganov, V. E. Yudin, J. Vuorinen, Characterization and corrosion protection properties of epoxy powder coatings containing nanoclays, Prog. Org. Coat. Prog. Org. Coat. 76 (2013) 757-767.
30. M. D. Tomić, B. Dunjić, V. Likić, J. Bajat, J. Rogan, J. Djonlagić. The use of nanoclay in preparation of epoxy anticorrosive coatings, Prog. Org. Coat. Prog. Org. Coat. 76 (2014) 757-767.

OTHER EMBODIMENTS

It is to be understood that while the present application has been described in conjunction with the detailed description, the foregoing description is intended to illustrate and not limit the scope of the present application, which is defined by the scope of the appended claims. Other aspects, advantages, and modifications are within the scope of the following claims.

What is claimed is:

1. A corrosion protection composition comprising a polymer composition that comprises about 3 wt. % phyllosilicate clay that is intercalated with a C1-22 alkyl amine or a C1-22 alkyl ammonium cation.

2. The corrosion protection composition of claim 1, wherein the polymer is an epoxy resin.

3. The corrosion protection composition of claim 2, wherein the epoxy resin is a diglycidyl ether of bisphenol A (DGEBA).

4. The corrosion protection composition of claim 1, wherein the phyllosilicate clay is a bentonite.

5. The corrosion protection composition of claim 1, wherein the clay comprises a hexadecylamine or a hexadecylammonium cation.

6. The corrosion protection composition of claim 1, further comprising an amine hardener.

7. The corrosion protection composition of claim 6, wherein the amine hardener is 4,4'-methylenedianiline.

8. The corrosion protection composition of claim 1, further comprising an organic solvent.

9. The corrosion protection composition of claim 1, wherein the organic solvent is xylene.

10. A corrosion protection composition comprising a diglycidyl ether of bisphenol A (DGEBA) resin composition saturated with a modified bentonite clay that is intercalated with a hexadecylamine or a hexadecylammonium cation, wherein an amount of the modified bentonite clay in the saturated resin composition is about 3 wt. %.

11. A method of protecting a metal surface from corrosion, the method comprising coating the metal surface with a corrosion protection composition comprising a polymer composition comprising about 3 wt. % of a clay that is intercalated with a C1-22 alkyl amine or a C1-22 alkyl ammonium cation.

12. The method of claim 11, wherein the metal surface is steel surface.

13. The method of claim 11, wherein the polymer is an epoxy resin.

14. The method of claim 11, wherein the clay further comprises a phyllosilicate clay.

15. The method of claim 11, wherein a resistance of the coating on the metal surface is greater than about $10 \times 10^4$ $\Omega \cdot cm^2$.

16. The method of claim 15, wherein the resistance is in the range of about $1 \times 10^8$ $\Omega \cdot cm^2$ to about $10 \times 10^8$ $\Omega \cdot cm^2$.

17. The method of claim 11, wherein a capacitance of the coating on the metal surface is less than about $1 \times 10^{-5}$ F.

18. The method of claim 17, wherein the capacitance is in the range of about $1 \times 10^{-11}$ F to about $1 \times 10^{-11}$ F.

19. A method of protecting a metal surface from corrosion, the method comprising coating the metal surface with a corrosion protection composition comprising an epoxy resin composition comprising 3 wt. % of a phyllosilicate clay that is intercalated with a C1-22 alkyl amine or a C1-22 alkyl ammonium cation, wherein a resistance of the coating on the metal surface is greater than about $5 \times 10^8$ $\Omega \cdot cm^2$.

* * * * *

UNITED STATES PATENT AND TRADEMARK OFFICE
CERTIFICATE OF CORRECTION

PATENT NO. : 10,865,340 B2
APPLICATION NO. : 16/288961
DATED : December 15, 2020
INVENTOR(S) : Al-Shahran et al.

Page 1 of 1

It is certified that error appears in the above-identified patent and that said Letters Patent is hereby corrected as shown below:

In the Claims

Column 14, Line 14, Claim 15, delete "$10 \times 10^4$" and insert -- $1 \times 10^4$ --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*